United States Patent [19]

Gerry

[11] 4,291,661

[45] Sep. 29, 1981

[54] INDUCTIVE-CAPACITIVE MODULATED IGNITION SYSTEM

[76] Inventor: Martin E. Gerry, 13452 Winthrope St., Santa Ana, Calif. 92705

[21] Appl. No.: 65,891

[22] Filed: Aug. 13, 1979

Related U.S. Application Data

[63] Continuation-in-part of Ser. No. 812,912, Jul. 5, 1977, Pat. No. 4,176,647, Ser. No. 868,118, Jan. 9, 1978, Pat. No. 4,168,692, Ser. No. 878,792, Feb. 17, 1978, Pat. No. 4,169,445, Ser. No. 913,437, Jun. 7, 1978, abandoned, Ser. No. 923,828, Jun. 12, 1978, Pat. No. 4,216,412, Ser. No. 960,871, Nov. 15, 1978, Pat. No. 4,206,736, Ser. No. 35,013, May 1, 1979, abandoned, and Ser. No. 44,301, May 31, 1979, Pat. No. 4,258,296.

[51] Int. Cl.³ .............................................. F02P 15/10
[52] U.S. Cl. .................................. 123/606; 123/617; 123/620; 123/653; 315/209 T
[58] Field of Search .............. 123/598, 606, 607, 617, 123/653, 620; 315/209 R, 209 T, 209 CD

[56] References Cited

U.S. PATENT DOCUMENTS

| | | | |
|---|---|---|---|
| 3,820,520 | 6/1974 | Canup | 123/606 |
| 3,853,106 | 12/1974 | Canup | 123/606 |
| 3,897,767 | 8/1975 | Gordon et al. | 123/607 |
| 3,973,545 | 8/1976 | Fischman et al. | 123/598 |
| 4,122,815 | 10/1978 | Gerry | 123/606 |
| 4,139,804 | 2/1979 | Gerry | 123/606 |
| 4,144,476 | 3/1979 | Gerry | 123/653 |

*Primary Examiner*—Charles J. Myhre
*Assistant Examiner*—Andrew M. Dolinar

[57] ABSTRACT

An inductive-capacitive cyclic charge-discharge ignition system includes an ignition transformer primary winding in parallel with a capacitor and fed by a unipolar alternating current source providing a plural number of repetition cycles during each igniter firing period. Such unipolar cycles cause the capacitor and primary winding to charge and discharge during each of the repetition cycles creating a plurality of ringing periods for each igniter firing period. A diode or an additional capacitor, or both, inserted in series with the parallel combination of the first stated capacitor and primary winding, substantially increases the velocity of arc provided by an igniter. The system is triggered by a magnetic pulse generating timer which generates AC voltages to modulate the output of the unipolar source. Where discharge currents are developed, such generated AC voltages also modulate the discharge currents.

5 Claims, 6 Drawing Figures

INDUCTIVE-CAPACITIVE MODULATED IGNITION SYSTEM

CROSS REFERENCE TO RELATED APPLICATIONS

This application is a continuation in part of copending applications, as follows:

| Serial Number | Filing Date | Status |
| --- | --- | --- |
| 812,919 | July 5, 1977 | U.S. Pat. No. 4,176,647 |
| 868,118 | Jan. 9, 1978 | U.S. Pat. No. 4,168,692 |
| 878,792 | Feb. 17, 1978 | U.S. Pat. No. 4,169,445 |
| 913,437 | June 7, 1978 | now abandoned |
| 923,828 | June 12, 1978 | U.S. Pat. No. 4,216,412 |
| 960,871 | Nov. 15, 1978 | U.S. Pat. No. 4,206,736 |
| 035,013 | May 1, 1979 | now abandoned |
| 044,301 | May 31, 1979 | U.S. Pat. No. 4,258,296 |

BACKGROUND OF THE INVENTION

This invention is in the field of ignition systems for fuel burning engines and in particular in such ignition systems which have both a capacitor and an inductive winding of an ignition transformer cyclically charged and discharged in discharge aiding mode, and more particularly wherein such system employs a timer capable of performing a modulation function simultaneously with its timing function.

The principal prior art ignition systems may be categorized into three groups. The first category of such prior art systems, referred to as the Kettering system, uses a capacitor in series with a primary winding of an ignition transformer wherein the capacitor is short-circuited by a timer so as to permit the primary winding to be charged by a DC source. The timer then removes the short circuit from the capacitor to permit the charged winding to discharge into the capacitor so as to create a single ringing circuit component, used to fire an igniter.

The second category of such prior art systems, referred to as a capacitive discharge system, also has a capacitor in series with an ignition transformer winding. Controlled by an appropriate timer, the capacitor is charged, generally by a higher DC voltage than in the Kettering system, such higher DC voltage being generated in the system. The timer then enables the charged capacitor to discharge into the transformer winding also creating a single ringing current component of somewhat higher voltage peak than the Kettering system to fire an igniter.

The third category of such prior art systems involves the use of a generated AC wave by such prior art system and attempts to apply such generated wave either to an ignition transformer or directly to a distributor in order to fire an igniter.

With respect to the first category, or Kettering prior art system, the main problem lies in the fact that the system attempts to precharge an inductor using a DC source in anticipation of an igniter firing cycle. It is well-known that an inductor energized by DC alone cannot charge to its full current level in a short period of time, and therefore, cannot rapidly produce an induced voltage therein. Hence, only a portion of the maximum current quantity can be made to flow through the primary winding during the charging mode, with consequent nonuse of the full energy storage capability of such primary winding, and therefore, loss of electrical power delivery capability to fire the igniter is experienced.

The current conduction through an inductor powered by a DC source, such as a battery, when switched on by the timer may be expressed as:

$$i = (V_{dc}/R)(1 - e^{-(R/L) \cdot t})$$

where i is the current at any instant of time, t is time, $V_{dc}$ is the voltage provided by the DC source, R is the circuit resistance of the inductor and DC source, L is the inductance of the primary winding and (R/L) is the time constant of the circuit.

From such equation, it can be seen that when t=0, i=0, and when t approaches infinity, i approaches the value of ($V_{dc}/R$). Based on typical values of L and R, it would take about 100 milliseconds for the primary winding to be almost fully charged, and a typical primary winding charging period is generally not greater than 5 milliseconds.

It is, therefore, obvious that the use of a DC source to charge the primary winding of the Kettering or first category of ignition systems is self-defeating in that possibly no more than half the inductor's charge capacity can be effectively utilized.

With respect to the second category or capacitive discharge system, a like result, with very little improvement over the Kettering system, is realized.

In such second category system, the higher DC voltage to precharge the capacitor is obtained by using an electronic oscillator to generate a higher AC voltage which is then converted to DC by rectification and filtering. The higher DC voltage is controlled by a timer to precharge the capacitor and then discharge the capacitor into the ignition-transformer winding to fire an igniter. If one keeps in mind that a charged capacitor is just like a DC source, then one can apply the foregoing equation which defines current in the transformer winding. Although the value of $V_{dc}$ representing the charged capacitor will be higher than in the case of the Kettering system, one must not lose sight of the fact that the energy content of a charged capacitor is limited by the capacitance and hence its ability to deliver current for an extended time period is limited. Hence, although a higher peak single ringing cycle will result due to the charge from the capacitor being dumped into the transformer winding, the single ringing period will be substantially shortened compared with the single ringing period of the Kettering system.

Since energy is a function of the product of power and time, the advantage of the capacitive discharge system over the Kettering system is minimized due to the lesser amount of time during which energy is present to fire the igniter.

With respect to the third category of prior art ignition systems or the AC systems, the major problem resides in the inability of the prior art to recognize how to transfer the power from the AC generator to the load, the load generally being a transformer. Consequently, although such system might basically be able to provide AC power over longer periods of time, these systems suffer from the lack of technique in effectively transferring such power and particularly providing higher current levels to the load.

The need for such higher current levels has been repeatedly stated in periodicals and patents written by those in the automotive manufacturing industry and in the automotive fuel-producing industry such as Texaco.

Such periodicals or patents generally show a high power AC rectangular wave generator employing a transformer wherein one of the windings thereof is used to saturate the transformer core by employing a DC source connected to that winding, so as to prevent the generator from producing power. A timer, coupled to such winding, enables the core to go out of saturation, and ostensibly enables the generator to provide AC power by magnetic induction through a high voltage winding of the transformer to an igniter load.

The basic problem with such generator resides in the high impedance experienced in the electronic circuit of the generator where the transistors are located, when under actual load conditions such as when the igniter is attempting to arc. Reflected impedance of the high voltage winding into the lower voltage winding to which the transistors are connected plus the self-impedance of such lower voltage winding would severely limit the current circulating in the collector-emitter circuits, and consequently would result in a lowered voltage and severely reduced current levels deliverable to the actual igniter. Thus, not only is the voltage across the so-called high voltage winding of such prior art AC system lower than expected, but the required higher current level for feeding the igniter in order to overcome high pressure fuel-flow across the igniter base, and in particular where the air-to-fuel ratio is in the order of 18 to 1 or greater (lean-burn engines), is not available.

Additionally, such prior art AC systems are inhibited from rapid duty cycling of their AC generator principally by magnetically saturating the generator's transformer core to inhibit oscillations. Sight is lost of the fact that the DC current used to saturate such core results in a comparatively long time for the core to reach saturation (see formula above), and hence slows up the cycling of the generator between its operative and quiescent mode. As a result, the prior art AC systems provide triangular-shaped current waveforms which inherently have slow rates of change in their waveforms as a function of time and therefore result in a reduced induced voltage in the high voltage winding, inasmuch as by Faraday's law of induction, such reduced voltage is a function of the rate of change of current. It can be appreciated that if, for example, the prior art could have overcome the above problems residual in their AC source and could provide a current waveform output with a fast rate of change, such as one approaching a rectangular waveshape, at least the output voltage of such generator would be increased. However, the problem of being able to deliver higher currents to the load would still remain unsolved.

Accordingly, neither the Kettering, capacitive discharge, nor AC system is capable of delivery of sufficient quantities of energy to fire an igniter, in order to enable the igniter to cause all fuel in an engine cylinder to be consumed and not wasted by failure of the ignition arc to burn same.

A further disadvantage of prior art ignition systems is that they cannot charge the inductor or transformer winding and the capacitor in a way so that discharge currents therefrom are additive and aid each other.

A still further disadvantage of the prior art systems is their inability to deliver sufficient energy to fire an igniter for extended periods of time.

Yet a further disadvantage of the prior art systems is their inability to deliver more than one ringing cycle during an igniter firing period.

Yet another disadvantage of the precharged inductor or capacitor prior art systems is their inability to rapidly charge the inductor due to use of DC power, with attendant inability to deliver sufficient energy to fire an igniter so as to effectively cause all the fuel to burn during an igniter firing period.

Yet another important disadvantage of any prior art system is the inability of the system to accelerate the arc luminous particles to such high velocity so that such arc can adequately overcome internal engine and fuel-flow pressures. Such prior art systems are therefore unable to use an igniter that develops long arc lengths between its electrodes. Such deficiency results in initation of a small fuel ignited nodule during the initial ignition period which is insufficient in mass and area to cause all fuel in a cylinder to be consumed and not wasted.

Other disadvantages with such prior art systems reside in their complexity due to the need of a large quantity of electronic components which also gives rise to unreliability as well as high cost of production.

SUMMARY OF THE INVENTION

Accordingly, one objective of this invention is to provide an ignition system which would deliver a high energy quantity during each igniter firing period so that all fuel in the engine cylinder would be ignited and converted to useful power without passing any unignited fuel into the engine's exhaust system.

A further objective of this invention is to devise an ignition system wherein the primary winding of the ignition transformer and a capacitor connected thereto would be charged in such way so that discharge currents from the primary winding and capacitor would be additive so as to increase the energy content fed to the igniter.

A still further objective of this invention is to provide an ignition system having a plurality of charge-discharge cycles of both the primary winding and capacitor connected thereto during any one igniter firing period so as to further increase the energy level fed to the igniter during such firing period.

Yet another objective of this invention is to utilize a power source to charge the primary winding and the capacitor connected thereto which will enable such primary winding and capacitor to be charged rapidly and fully.

Still another important objective of this invention is to provide an ignition system which will develop long arcs across the bases of igniters and wherein such long arcs, composed of luminous particles, shall have velocities substantially higher than velocities of arcs developed either by a Kettering, capacitive discharge or prior art AC systems, so as to overcome high internal engine pressures and high pressure fuel-flow past the electrodes of the igniters.

And, yet another objective of this invention is to provide a simplified magnetically generating pulse timer which acts as a modulator at the same time as performing its timing function, so as to modulate and thereby increase the energy provided by the AC power source as well as to increase the energy content of any discharge currents where provided.

Yet a further objective of this invention is to provide highly reliable electronic circuitry using a minimum number of parts and simple in structure.

Hence, a system is provided which utilizes an electronic repetitive wave generator which is electrically duty cycled, and which generator provides an output of a plurality of unipolar waves during each igniter firing period.

The primary winding of an ignition transformer is connected in parallel with a capacitor, and the parallel combination is connected to the output of the unipolar wave generator.

The unipolar generator waveform output has the ability to charge both the capacitor and primary winding during each half of each repetition period of its output waveform. The manner in which the capacitor and primary winding are charged during each first half cycle of each of the generator's repetition periods enables discharge currents from the capacitor to add to the discharge currents of the primary winding, thereby creating a large amplitude ringing cycle having relatively steep wavefronts during each other half of the generator's repetition periods, resulting in a plurality of ringing cycles with extremely high energy content delivered to an igniter for firing such igniter during each igniter firing period.

The output power of the unipolar generator is modulated by the magnetic timer as it generates a variety of frequencies during its operating periods. Such modulator ultimately increases the current flow and its rate of flow through the primary winding of the ignition transformer thus increasing the energy level of the system.

By inserting either a diode or another capacitor, or both, between the unipolar generator's output circuit and the parallel combination of the primary winding and capacitor, the velocity of an arc, created at the base of the igniter, is substantially increased as compared with the arc velocity where an igniter is powered by either a Kettering, capacitive discharge or prior art AC system.

Additionally, the inventive system enables an igniter which is about 250 thousandths of an inch in dimension between its arcing electrodes, to create an arc which may be as long as 350 thousandths of an inch. Such dimension between electrodes is established by removing the gap-adjusting member from a conventional igniter so that arcs can travel between the axial electrode and the inner base periphery. Such arc length would be extinguished in prior art igniter systems, even if such systems were capable of producing such arcs, due to the high internal engine pressure. However, the increased arc velocity of the inventive system, easily overcomes such engine pressure and inhibits extinguishment of these long arcs, which provides for better fuel combustion.

The arc phenomena per se is a matter of additional importance. Such arc is comprised of an elongaged filament of highly concentrated luminous particles, which filament extends between the axial electrode and base. The filament is increased in thickness at its ends. Surrounding such filament is an envelope of luminous particles of lesser density than the filament, such envelope having approximately spherically-shaped terminations which will often glow like a light bulb.

Such phenomena may be seen in the drawings of U.S. Application Ser. No. 035,013 filed May 1, 1979.

DETAILED DESCRIPTION

Figure 1:
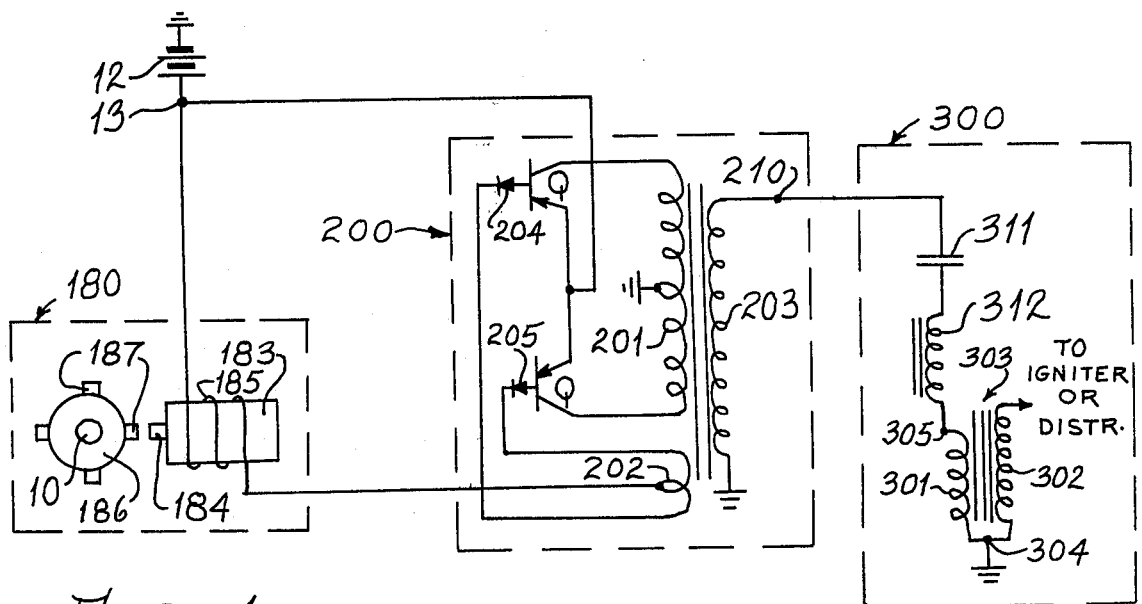
FIG. 1 is an electrical schematic of the ignition system in accordance with the invention.

Referring to ALL FIGURES, an ignition system delivering large quantities of electrical energy to an igniter or igniters in a fuel combustion engine, utilizes a magnetic pulse generating timer devoid of capacitors and having a magnetic sensor with a sensing coil which is directly coupled to an AC energy generating source. A conventional ground symbol in the drawings refers throughout this specification to negative battery potential which is the zero reference level for DC or AC voltages or currents, and is also a signal return path symbol for AC signals.

Referring to FIG. 1, battery 12 provides DC power from its positive terminal 13 to timer 180 and to the center-tap of winding 202 of a transformer used in AC generator 200. DC power is also provided by terminal 13 to emitters of transistors Q in generator 200.

A magnetically generating pulse timer is illustrated at 180, wherein magnetic reluctor wheel 186 is driven by engine distributor shaft 10. A positive DC potential is provided to this timer from junction 13. DC power is provided by battery 13 at junction 13 to coil 185, wound on permanent magnet core 183. Core 183 has a magnetic pole piece 184 for enabling magnetic flux to be induced in coil 185 by virtue of magnetic protrusions 187, integral with reluctor wheel 186, being driven past pole piece 184 due to shaft 10 being driven by the engine. The other end of coil 185 is connected to the center tap of winding 202 of power source 200 to enable bias voltages to be provided thereat.

When reluctor wheel 186 is at standstill, the center tap of winding 202 and hence the bases of transistors Q are at positive DC potential and transistors Q do not conduct, since PNP type transistors require a lower base potential than the potential of their emitters, thereby inhibiting oscillation of generator 200. When reluctor wheel 186 is driven by shaft 10 and when protrusions 187 are driven past pole piece 184, a negative-going voltage pulse is induced in winding 185, which pulse is sufficient in amplitude to overcome the positive DC potential at the center tap of winding 202, thereby lowering the base potentials of transistors Q to a negative value to create base current flow in one of transistors Q, and causing generator 200 to oscillate.

The following table briefly shows the logic imposed by timer 180 upon the system of FIG. 1.

| Protrusion 187 | Potential at Center-Tap of 202 | DC Bias at Bases of Qs | Condition of Generator 200 |
| --- | --- | --- | --- |
| not driven past pole piece 184 | + | + | does not oscillate |
| driven past pole piece 184 | − | − | oscillates |

Alternating current generator 200 supplies a single polarity or unipolar voltage output across its winding 203. The reason for such unipolar voltage is due to the fact that one end of winding 203 is at zero or ground potential, and such voltage rises from the zero or ground reference level to its maximum value and then stays at the maximum level for one-half cycle. At the end of such half-cycle, the voltage falls to zero level staying at zero level for the other half-cycle. These cyclic excursions are repeated a plural number of times for any one igniter firing period. Although this generator provides a rectangular waveshape, it is pointed out that a generator providing any waveshape except DC, regular in form or complex, may be utilized in this invention.

It should also be noted that winding 203 could be connected to positive DC terminal 13 of battery 12 instead of ground, in which case the waveform output of generator 200 would be shifted upward by the voltage level of battery 12.

Since transistors Q are of the PNP type, gnerator 200 provides oscillations during each of the periods when one of protrusions 187 is opposite, at least in part, to pole piece 184. Generator 200 may utilize diodes 204 and 205 connected in the base circuits of each of transistors Q in a forward base current direction. Such diodes will inhibit base currents of opposite to normal base current direction flow created by high transient conditions and prevent burnout of transistors Q.

It may be noted that the voltage of the waveform across winding 203 may be a rectangular wave with cyclic excursions between its zero reference level and its peak level. Such waveshape notably already resembles an ideal half wave rectified signal. The advantage of using such unipolar waveform, even if it is changed in shape by use of inductive-capacitive reactive loads and is therefore no longer rectangular in shape, is that it is possible to cyclically charge and discharge inductive-capacitive load components connected to winding 203 during any one cycle or repetition period of such wave without the need of any additional control components. Such advantage contributes to circuit simplicity with accompanied advantage of being able to generate a multiplicity of ringing oscillation periods during any one igniter firing period so as to very substantially increase the power and energy delivered to an igniter during its firing period.

When timer 180 keys generator 200 to its oscillatory mode thereby providing a negative-going bias voltage pulse to the bases of power transistors Q via feedback winding 202, base current is caused to flow through the base-emitter junction of one of the transistors Q. The circuit composed of one of transistors Q and one-half of winding 201 fed by +DC at the emitters of transistors Q, will thereupon have collector current flowing therein in alternation with the other half of winding 201 and the other transistor Q, via their respective collector-to-emitter junctions to ground so as to create the oscillatory waveform output at 203. Through transistors Q are of the same type, each transistor has sufficiently slightly dissimilar characteristics so that one or the other of these transistors will draw collector current first to start the oscillation process. This type of oscillator circuit is generally known in the art as a Royer oscillator, although generator 200 herein has been substantially improved by duty cycling of such generator in switching its bias current on and off. Such duty cycling enables operation of the transistors for less than half the time during a firing cycle so as to prevent their overheating, and thereby improve their reliability and extend their operating life.

The basic Royer oscillator is shown and described in detail in technical bulletin TC-101B, entitled Magnetic Tape Cores, at pages 45 and 46, published by Arnold Engineering Company of Marengo, Illinois, copyright 1972. Such oscillator is also shown in U.S. Pat. No. 3,841,287.

The rate or frequency of oscillation of generator 200 is dependent upon design of the transformer used in the generator, but generally from 2,000 to 3,000 cycles or repetition periods per second has been found satisfactory for this ignition system.

The transformer of generator 200 has a secondary winding 203 which provides energy at its output terminal 210 to an external load 300. Such load includes primary winding 301 of ignition transformer 303, in series with capacitor 311 and charge accumulator inductor 312 for temporarily storing electrical energy. Transformer 303 has a secondary winding 302 which is coupled directly to an igniter or to a group of igniters in sequence through a high voltage distributor, known in the art and not shown herein.

Charge accumulator inductor 312 has a laminated core and a coil wound on the core. Such accumulator inductor rapidly accumulates charge and delivers such charge to primary 301. This inductor makes up for the deficiencies of the core of the output transformer of generator 200. Cores conventionally used to make such output transformer are generally made of magnetic wound tape in torroidal form, and are both expensive, fragile and have comparatively low flux density characteristics as compared with the core of inductor 312 which is made of inexpensive laminations of cold rolled steel, relay steel or the like. Such inexpensive type cores are used for making power transformers or low frequency audio transformers, and have between 20 and 24 kilograms flux density, as compared with a maximum flux density of about 12 kilogauss for the tape-wound cores. This core also has other advantages over the tape-wound cores in that after a magnetization cycle, little or substantially no remnant flux remains in the core when inductor 312 is discharged of its flux, inapposite to tape-wound cores which have a relatively high remnant flux. A core with little or no remnant flux will enable the inductor to take on more charge and deliver most of such new charge when called upon by the system. Consequently, inductor 312 as used, has a one-inch-square cross-section area of the laminations and 75 turns of number 18 gage wire.

Capacitor 311 is the means for enabling current, and hence power, to be transferred from primary circuit winding 201 through secondary 203 to the load, in this case to inductor 312 and primary winding 301. Without such capacitor the current in winding 203 and hence in the load would not be present in sufficient quantity and consequently the induced voltage in primary 301 would be inadequate. Considering that the circuit comprising winding 203, primary 301 and reflected reactance of secondary 302 as well as the reactance of inductor 312, the capacitive reactance presented by capacitor 311 enables compensation of these inductive reactances, resulting in an increased primary winding current. The resonance principle cannot be used in its entirety to explain the phenomena involving the capacitor's compensation function, since resonance generally involves a single frequency, and consequently unlike here, unique reactance value. In this system multiple frequencies are generated by power source 200 which involve a like number of different reactances. In any event, such capacitor 311 is selected by trying various values of capacitors until the primary current is at a maximum. The primary current may be conveniently measured and observed by using a one-ohm high power resistor in the primary winding circuit, and measuring the voltage across such resistor by means of an accurately calibrated high frequency oscilloscope. Typical capacitor values will be in the order of between 0.2 to 1.0 microfarads.

Ignition transformer 303 was selected to have a turns ratio of 100, somewhat higher than stock automobile transformer turns ratios, since this will provide a greater voltage induced in secondary 302 to activate an igniter or group of igniters in sequence through a switching distributor.

Figure 2:
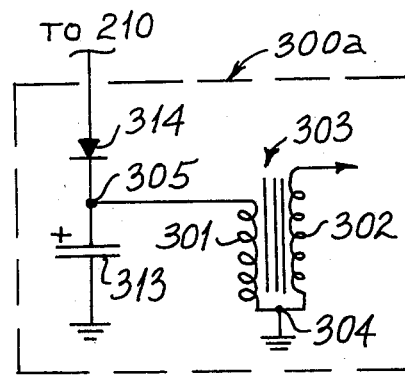
FIG. 2 is an electrical schematic of the load circuit portion of the system substituted for the load circuit shown in FIG. 1.

Referring to FIG. 2, load circuit 300a is substituted for load circuit 300 in FIG. 1, by connecting same to output terminal 210 of generator 200.

The current flowing into junction 305 through diode 314 due to the unipolar voltage across winding 203, divides into current components which respectively charge capacitor 313 and primary 301, so that one terminal of capacitor 313 is charged to a positive potential as indicated. These charging current components are initiated during the conductive portions of each cycle of the rectangular wave output of generator 200, constituting charging components every half-cycle period.

It must be remembered that the unipolar voltage fed to winding 301 and capacitor 313 causes primary winding 301 and capacitor 313 to be rapidly and completly charge without being plagued, as in other ignition systems, by a conventional bipolar waveform charging voltage or current wherein negative excursions cancel the effect of the positive excursions. It should also be noted that the unipolar waveform, by virtue of its rapid charging ability, avoids the disadvantage inherent in a conventional ignition system utilizing DC current which slowly charges the primary winding of an ignition transformer as well as also avoiding the slow discharge rate of a capacitor into an ignition transformer winding encountered in a capacitive-discharge system.

It should be remembered that, once charged, such winding 301 and capacitor 313 will remain charged during the flat or constant voltage portion of the conductive half-cycle period of the output waveform appearing at 203. When the circuit equilibrium is disturbed at a time the forcing voltage function across winding 203 feeding these components suddenly going through a transition state, to cause the voltage output to drop to the zero level, discharge currents from winding 301 and capacitor 313 will start to flow. The discharge current flow from an inductor will continue in the same direction as its charge current direction flow, but the discharge current from a capacitor will have a direction reverse to its charge current direction, thereby aiding the discharge current in the inductor.

Consequently, discharge current from capacitor 313 will initiate its discharge flow in opposite direction to its charge current flow, as indeed it has to, since the discharge current component must start flowing in a direction away from the capacitor's positively charged terminal. Hence, the discharge component from capacitor 313 flowing through junction 305 will be additive to the discharge component flowing through winding 301, thereby increasing the current flow through primary winding 301. The same charging process will be repeated during subsequent oscillatory periods, and the same discharge process will also similarly be repeated a number of times during any one igniter firing period, to add the capacitor discharge current to the inductor discharge current for each cycle of generator 200 output waveform, inapposite to prior art systems which only depend upon charging either an inductor or a capacitor using DC power as the charging means. Diode 314 will inhibit positively polarized discharge current components from flowing back through winding 203.

It should be realized that the discharge action causes ringing type oscillation of the parallel circuit comprising inductive winding 301 and capacitor 313, by virtue of discharge current components circulating in winding 301 and capacitor 313. Hence, such ringing oscillation will occur during each quiescent wave portion of the output wave at winding 203, thereby providing a plural number of ringing cycles in sequence during any one igniter firing period, instead of the conventional one ringing cycle. Each ringing oscillation will have both positive and negative excursions or be bipolar in character.

At an average engine speed of 3,000 revolutions per minute for a four-cylinder engine having a 45 degree dwell period, an igniter would fire for approximately 5 milliseconds during which time 15 ringing cycles would be experienced. At the engine idling speed, about 45 ringing cycles per igniter firing would be experienced, and at starting speeds as much as 100 or more ringing cycles would occur, thereby facilitating starting the engine. All these ringing cycles per igniter firing may be compared with the single ringing period at substantially lower voltage and current levels provided by a conventional ignition system, in order to appreciate the advantages afforded by this functionally high energy but structurally simple ignition system.

Figure 3:
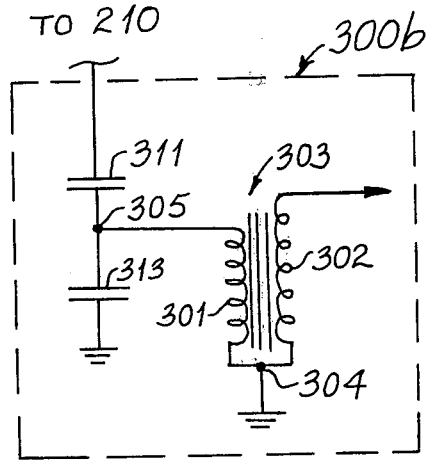
FIG. 3 is an electrical schematic of another load circuit substituting for the load circuit of FIG. 1.

Referring to FIG. 3, load circuit 300b is substituted for load circuit 300, so that capacitor 311 of circuit 300b is connected to output terminal 210. Such capacitor 311 in load circuit 300b is used in lieu of diode 314 of load circuit 300a, and provides somewhat similar functions, except that capacitor 311 permits bipolar currents to pass through junction 305 and winding 203.

The substitution of capacitor 311 for diode 314 clearly shows the presence of a multiplicity of ringing cycles for any one igniter firing period, which may be seen in the photographs of FIGS. 10 through 14 of U.S. Pat. application Ser. No. 035,013, filed May 1, 1979.

Capacitor 311 either avoids the creation of multi-spectra bands present when diode 314 is used, or acts as a filter for such multi-spectra bands as created by the diode. Without a diode in circuit 300b but with capacitor 311 in such circuit, such capacitor also represses some of the very high frequency components, making it possible to clearly see the multiple ringing cycles in the oscilloscopic patterns shown in the patent application referred to above.

Figure 4:
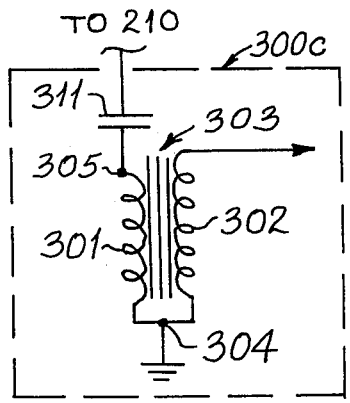
FIG. 4 is an electrical schematic of still another load circuit substituted for the load circuit of FIG. 1.

Referring to FIG. 4, the system of FIG. 1 is changed by replacing load 300 with load 300c. In such case, junction 210 will be connected to capacitor 311, and capacitor 311 will be connected to terminal 305. Load circuit 300c does not require storage inductor 312 since the core material of the output transformer of generator 200 has a high kilogauss storage capacity, enabling large energy quantities to be stored therein.

With respect to FIGS. 1 through 4, it should be noted that these structures employ an ignition transformer which has its common junction 304 between primary winding 301 and secondary winding 302 at ground potential. This is possible in view of the fact that these circuits do not utilize DC power to precharge primary winding 301.

Avoiding the need to precharge primary winding 301, and of course discharge of same, also avoids the need for an additional switch in the circuit of primary winding 301. The use of an additional switch makes it advisable to connect such switch to terminal 305 rather than to terminal 304 to preclude high induced voltages in secondary winding 302 from being simultaneously switched. Thus, whenever an additional NPN type switch is used to switch primary winding 301 and to maintain such primary winding in the collector circuit of the switch, it is preferable to connect such switch to terminal 305. Such connection is illustrated in FIG. 5.

Figure 5:
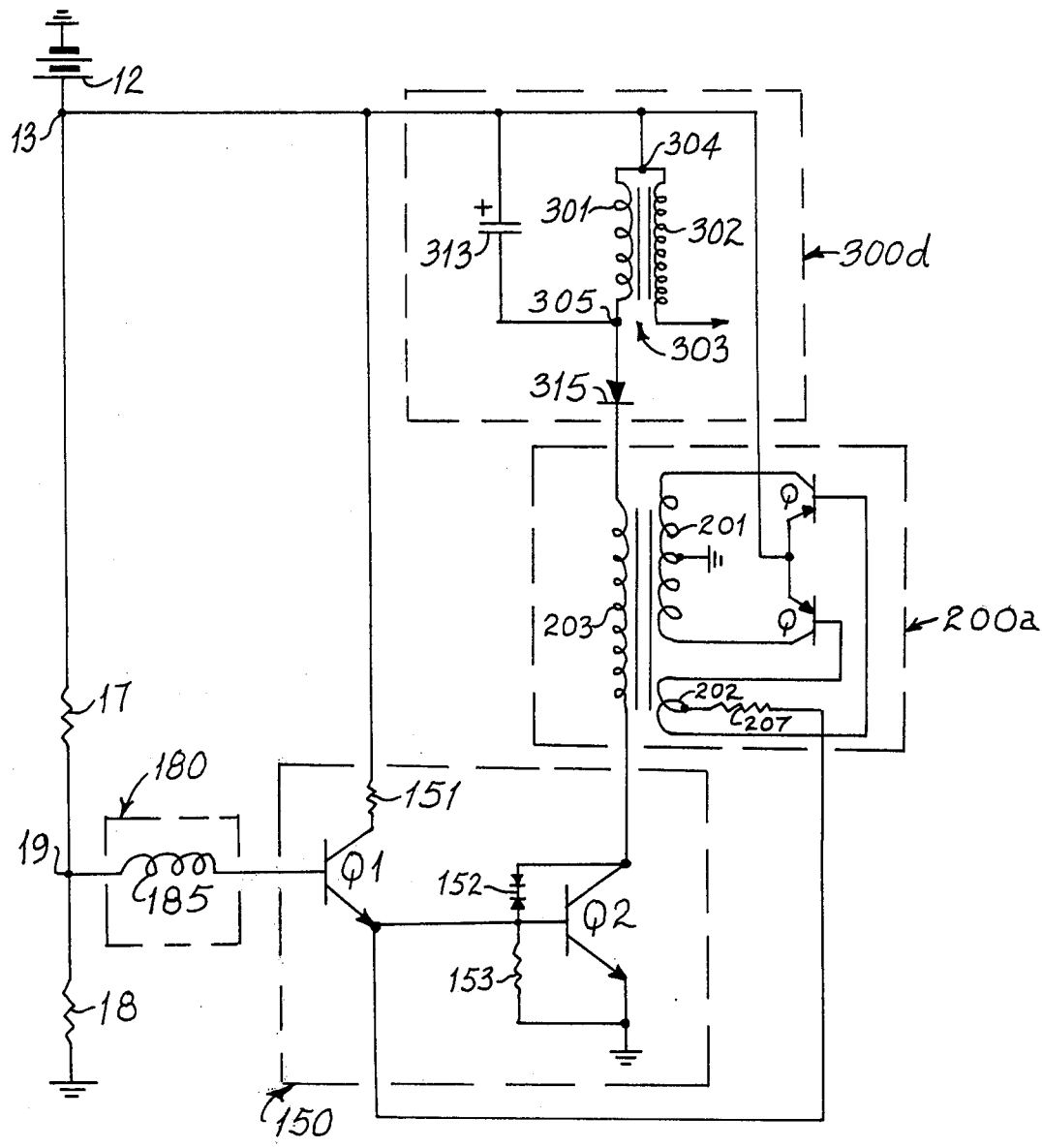
FIG. 5 is an electrical schematic of a variation of the circuit of FIG. 1, utilizing an additional electronic switch to effect two modes of operation.

Referring to FIG. 5, the ignition system therein utilizes timer 180 in conjunction with voltage divider network 17 and 18, as well as generator 200a, similar to generator 200, and ignition transformer 303 wherein its primary winding is connected in parallel with capacitor 313.

A Darlington circuit 150, comprising transistors Q1 and Q2, is used to provide the switching logic functions so as to enable primary winding 301 and its parallel connected capacitor 313 to be charged during a first mode of operation and discharged during a second mode of operation. Winding 203 is also charged and discharged during the first and second modes respectively.

DC power is fed to voltage divider network 17–18, the resistor values of which are selected so as to provide +1.2 volts between junction 19 and ground. Such voltage is sufficient, even considering the voltage drop through coil 185 of magnetic sensor 180, to provide a positive biasing voltage between the base of Q1 and its emitter during non-alignment of the protrusions of the reluctor wheel and the pole piece of the sensor, as discussed in conjunction with FIG. 1. With the base of Q1 positively biased, Q1 collector current will flow through resistor 151 and place the emitter of Q1 at positive potential, which of course biases the base of Q2 to a positive voltage level and causes Q2 to conduct, causing a charging current to flow through winding 203, diode 315, and through the parallel combination of primary 301 and capacitor 313 to charge the reactive components in such circuit. The direction of charging current through capacitor 313 and primary winding 301 will be the same, as discussed in connection with FIG. 2, except that here the charging period will extend over the entire first mode, generally being about 30 degrees of distributor rotor rotation in an 8 cylinder engine. The discharge current from capacitor 313 will also aid the discharge current of primary winding 301. Additionally, discharge current from charging winding 203 will also contribute to greater current flow in primary 301 and hence to a larger induced voltage therein.

Zener diode assembly 152 and resistor 153 serve to regulate the collector-base and collector-emitter voltages of Q2 in its non-conducting state, and hence serve to protect Q2 from burnout. Since generator 200a provides a very high voltage and current output, the voltages induced in primary 301 may be as high as 1000 volts peak-to-peak. Selecting the zener diodes to provide bilateral voltage regulation necessitates bipolar zener assembly such as at 152 that has a knee voltage which does not exceed the ratings of transistor Q2, say in the order of 500 volts, in order to regulate and maintain the Q2 electrodes to such levels during non-conduction of Q2. Resistor 153 would be of very low ohmic value, in the order of 25 to 50 ohms, and such value is considered in conjunction with the selection of the value of resistor 151 so that the DC voltage between the base and emitter of Q2 provided by battery 12 is below the base to emitter rated voltage of such transistor.

A connection is made between the emitter of Q1 and the center-tap of bias winding 202 through bias resistor 207. Bias resistor 207 is needed here to limit the base currents of transistors Q when they conduct, and absent such bias resistor such base currents would only be limited by the low ohmic value of resistor 153 and hence the base currents would be excessive, as well as producing excessive collector currents in transistors Q.

It is noted that generator 200a differs from generator 200 only with respect to the need of bias resistor 207 therein and the elimination of protective diodes 204 and 205 therefrom.

Darlington circuit 150 is a bit different from conventional Darlington circuits in that each collector of Q1 and Q2 has a different load therein, and Q2 has overvoltage protective features built-in. It is also different from the usual Darlington circuit in that its several stages can be independently utilized to provide different logic functions.

An understanding of its operation and how circuit 150 provides the switching logic and the two operational modes, may be obtained from the following truth table.

| Protrusion 187 | Potential at Base of Q1 | State of Q1 | State of Q2 | Condition of 203,301,313 | Condition of Generator 200a |
|---|---|---|---|---|---|
| not driven past pole piece 184 | + | ON | ON | charges | OFF |
| driven past pole piece 184 | − | OFF | OFF | discharges | ON |

The foregoing table, shows that when discharge current is present in components 203, 301 and 313, generator 200a also provides an output wave to modulate the discharge current. Simultaneously therewith, rotation of the reluctor wheel to drive protrusions 187 past pole piece 184, also produces modulation frequencies, so that in effect a double modulation of the discharge currents is being provided by the system during each igniter firing period.

Figure 6:
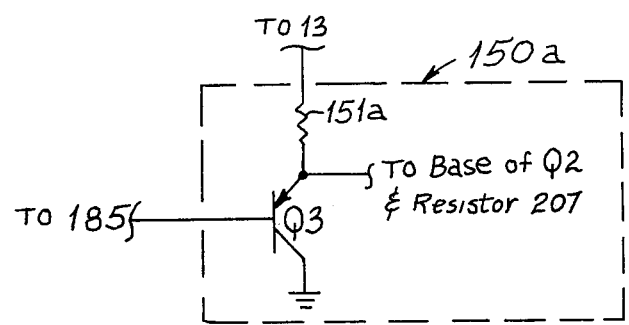
FIG. 6 is an electrical schematic of a logic switch usable in the circuit of FIG. 5.

Referring to FIG. 6, the system of FIG. 5 could be modified by use of logic circuit 150a instead of circuit 150. Hence, sensor coil 185 is connected to the base of PNP type transistor Q3, the emitter of which is connected to junction 13 through resistor 151a, performing a similar function to resistor 151 of circuit 150, and the collector of Q3 is at ground potential. Transistor Q3 in circuit 150a replaces Q1 of circuit 150. In circuit 150a, the emitter is also connected to the base of transistor Q2 and to bias resistor 207. Transistor Q2 is the same as in the case of circuit 150 with its zener diodes 152 and resistor 153. Circuit 150a is not a Darlington type circuit, and the overall current gain in the collector of Q2 due to triggering the signal from sensor coil 185 will be reduced in view of the lower DC forward current amplification characteristics of this circuit as compared with the Darlington circuit 150. However, functionally the same results will obtain as in the case of usage of circuit 150.

It is pointed out that it is possible with the use of a PNP transistor Q3 to make a direct coupling connection of coil 185 between the base thereof and junction 13.

The logic of the system utilizing circuit 150a, may be tabulated in the following truth table.

| Protrusion 187 | Potential at Base of Q3 | State of Q3 | State of Q2 | Condition of 203,301,313 | Condition of Generator 200a |
|---|---|---|---|---|---|
| not driven past pole piece 184 | + | OFF | ON | charges | OFF |
| driven past pole piece 184 | − | ON | OFF | discharges | ON |

Inasmuch as present day transistor technology does not provide a high voltage (600 volts), high collector current (20 amperes) transistor of the PNP type, NPN transistors have to be used when such high power levels are required, until such time as the semiconductor industry advances sufficiently to enable the production of such high power reliable PNP devices.

I claim:

1. An ignition system for an engine which develops motive power by burning fuel, said system including an ignition transformer and an alternating current energy source, comprising the combination of:
    a magnetically generating pulse timer having a sensing inductor coupled to said energy source; and
    an inductive-capacitive circuit connected to and intermittently powered by said energy source, said circuit including a capacitor and a primary winding of said ignition transformer series connected to said capacitor, said circuit being passive and devoid of switches and arc-gap devices, said energy source including active electronic power generating means for producing oscillations, and a coupling transformer having a first winding connected to said active means, a second winding coupled to said sensing inductor and a third winding coupled to said circuit.

2. The invention as stated in claim 1, wherein said sensing inductor has a sensing coil directly coupled to said energy source.

3. The invention as stated in claim 1, wherein said timer constitutes means for modulating output energy of said energy source.

4. An ignition system for an engine which develops motive power by burning fuel, said system including an ignition transformer, comprising the combination of:
    an alternating current energy source having a coupling transformer with an output winding, wherein said energy source includes active electronic power generating means for producing oscillations;
    a magnetically generating pulse timer having a sensing inductor, said inductor having a magnetic core and a sensing coil wound on said core, said sensing coil being coupled to said energy source, wherein said coupling transformer has a first winding connected to said active means and a second winding coupled to said sensing coil; and
    a circuit composed of a capacitor and a primary winding of said ignition transformer series connected to said capacitor, said circuit being connected to said output winding, said circuit being passive and devoid of switches and arc-gap devices.

5. The invention as stated in claim 4, wherein said timer constitutes means for modulating output energy of said energy source.

* * * * *